US009302850B2

(12) United States Patent
Fiore et al.

(10) Patent No.: US 9,302,850 B2
(45) Date of Patent: Apr. 5, 2016

(54) MODULAR IDLE ROLLER BELT FOR CONVEYOR OF ARTICLES

(75) Inventors: Antonio Fiore, Reggio Emilia (IT); Daniele Coen, Albinea (IT)

(73) Assignee: REXNORD FLATTOP EUROPE S.R.L., Correggio {Reggio Emilia} (IT)

( * ) Notice: Subject to any disclaimer, the term of this patent is extended or adjusted under 35 U.S.C. 154(b) by 0 days.

(21) Appl. No.: 14/241,979

(22) PCT Filed: Sep. 3, 2012

(86) PCT No.: PCT/EP2012/067085
§ 371 (c)(1),
(2), (4) Date: Jun. 17, 2014

(87) PCT Pub. No.: WO2013/030404
PCT Pub. Date: Mar. 7, 2013

(65) Prior Publication Data
US 2014/0346014 A1    Nov. 27, 2014

(30) Foreign Application Priority Data

Sep. 2, 2011  (IT) .............................. MI2011A1582

(51) Int. Cl.
*B65G 15/30* (2006.01)
*B65G 17/06* (2006.01)
(Continued)

(52) U.S. Cl.
CPC ................ *B65G 13/02* (2013.01); *B65G 15/30* (2013.01); *B65G 17/061* (2013.01); *B65G 17/08* (2013.01); *B65G 17/40* (2013.01)

(58) Field of Classification Search
None
See application file for complete search history.

(56) References Cited

U.S. PATENT DOCUMENTS

| 6,439,378 B1 * | 8/2002 | MacLachlan .......... | B65G 17/08 198/850 |
| 7,527,145 B2 * | 5/2009 | Zubair ................... | B65G 17/08 198/837 |

(Continued)

FOREIGN PATENT DOCUMENTS

| EP | 0 066 530 A1 | 12/1982 |
| FR | 2 128 664 A1 | 10/1972 |

(Continued)

OTHER PUBLICATIONS

The International Search Report as mailed on Nov. 9, 2012 for International Application No. PCT/EP2012/067085.

*Primary Examiner* — Kavel Singh
(74) *Attorney, Agent, or Firm* — Quarles & Brady LLP

(57) ABSTRACT

A modular roller belt (100,200) for transporting articles is proposed. The belt comprises a plurality of modules (105) for transporting the articles, and a plurality of hinge pins (110), each for hinging adjacent modules of the belt about a corresponding geometric axis (GAX). Each module comprises at least one roller (115a,115b,115c,115d) and at least one mounting pin (1201,1202) for mounting the at least one idle roller to the respective module; the at least one roller is freely rotatable about a respective rotation axis (RAX1, RAX2) defined by the corresponding mounting pin. In the solution according to one or more embodiments of the present invention, the rotation axis of facing rollers of adjacent modules along a belt moving direction (x) and the geometrical axis of the hinge pin located there between are spaced apart, in a direction orthogonal to a moving direction (sN) of the respective module, a vertical distance (H) such that a minimum distance between the outer surface of these rollers and the outer surface of the corresponding hinge pin is less than or equal to 3 mm.

15 Claims, 4 Drawing Sheets

(51) Int. Cl.
*B65G 17/08* (2006.01)
*B65G 13/02* (2006.01)
*B65G 17/40* (2006.01)

(56) References Cited

U.S. PATENT DOCUMENTS 7,775,345 B2 * 8/2010 Fourney ............... B65G 17/24
198/697

2010/0230245 A1 9/2010 Ragan et al.

FOREIGN PATENT DOCUMENTS

| FR | 2 711 630 | A1 | 5/1995 |
| WO | 01/83338 | A1 | 11/2001 |
| WO | 03/040010 | A2 | 5/2003 |
| WO | 2005073111 | A1 | 8/2005 |

* cited by examiner

MODULAR IDLE ROLLER BELT FOR CONVEYOR OF ARTICLES

CROSS-REFERENCE TO RELATED APPLICATIONS

This application represents the national stage entry of PCT International Application No. PCT/EP2012/067085 on filed on Sep. 3, 2012 and claims the benefit of Italian Patent Application No. MI2011A001582 filed Sep. 2, 2011. The contents of both of these applications are hereby incorporated by reference as if set forth in their entirety herein.

The present invention generally relates to the field of conveyors of articles. More specifically, the present invention refers to improved modular roller belts for conveyors of articles, for industrial or civil use.

Each article conveyor (more simply, conveyor) typically comprises a closed-loop (i.e., endless) support element adapted to support the articles to be transported, and drive elements (for example, electric motors, pinions and cogwheels) for moving the support element, thereby allowing the transportation of the articles placed thereon along a predetermined conveying path.

In particular, modular conveyor belts typically comprise a plurality of modules suitably hinged together by means of respective hinge pins.

As known, during the transport of articles accumulation regions can form, i.e. regions of the conveying path in which some of the articles, due to a reduction, even temporary, of the rate of transfer of the transported articles downstream of these regions, accumulate progressively pressing one against another, since they are subject to a push action caused by the friction between the transported articles and the surface of the moving belt. These mutual pressures between the articles can cause their breakage or damage, as well as a greater stress on the belt and/or on the drive elements (which in turn can result in dangerous friction and wear of the conveyor).

To avoid this, some conveyors are provided with modular roller belts, in which each module comprises one or more rollers (typically, of cylindrical shape) that act, as a whole, both as the supporting surface for the articles to be transported, and as sliding elements. In particular, each roller (or group of rollers) comprises a bore through which it is idly mounted about a respective mounting pin, i.e. it is freely rotatable about the rotation axis defined by the pin axis (which, typically, is a central axis of the roller); in this way, if, during the transport of articles, an accumulation of articles forms on the belt, the rotation of the rollers causes the advancement of the belt substantially independently from the advancement of the articles, thereby avoiding that excessive pressures are exerted between articles.

However, the belts of the type described above have drawbacks that preclude their wider use; in particular, this is mainly due to the fact that between adjacent rollers (of the same module and/or adjacent modules) gaps or interstices are present (i.e., regions of space between adjacent rollers and substantially bounded by their outer surfaces) that may cause phenomena of jamming of the articles.

To avoid these jam phenomena, typically the modular roller belt has to be designed in such a way that parameters such as the roller pitch (i.e., the distance between the respective central axes of adjacent rollers along the direction of advancement of the belt), and the roller diameter are appropriately sized. In fact, as known, these parameters determine, in combination, the extension (in width and depth) of the interstices, while the roller diameter compared to that of the mounting pin affects the friction coefficient between them: for this reason the dimensioning of these parameters is not simple, and often involves design tradeoffs, thereby the belt has a non-optimal transport efficiency.

More specifically, this is due to the fact that a decrease in the pitch (so to reduce the extension of the interstices), and in particular the pitch of the facing rollers of adjacent modules, would deprive the belt of the possibility of freely bending and counter-bending about the geometric axes defined by the respective hinge pins (since, when the belt bends or counter-bends, the rollers, being close to each other due to the reduced pitch, would quickly result to contact each other). Conversely, an increase in the roller diameter (to reduce the friction coefficient) necessarily involves, for a same pitch, an increase of the depth of the interstices seen by the articles (due to the increase of the external roller surface), in addition to the drawbacks of bending just discussed (since the roller outer surfaces, being more extended, would be closer).

The applicant has noted that these problems are exacerbated for the transport of certain classes of articles. For example, articles which have at their base, or at regions that during the transport lay on the rollers, a shaped conformation (as in the case of the supporting feet of plastic bottles for beverages), are much more easily subject to jam phenomena. For an optimal transport of such classes of articles, in fact, the roller pitch and the roller diameter must meet particularly strict requirements (for example, they must not exceed limit values, such as 18 mm and 19 mm, respectively). These requirements are e.g. listed in DIN EN 619:2011-02. However, the complying these requirements by exploiting the approach based on the design compromise between roller diameter and pitch does not enable to obtain modular roller belts with interstices of sufficiently reduced extension and rollers with a friction coefficient sufficiently high to allow an optimal transport of such articles.

The applicant has therefore tackled the problem of how to obtain a modular roller belt, particularly (though not specifically) suitable for use in conveyors of articles, which is not affected by the drawbacks mentioned above.

In general terms, the solution in accordance with one or more embodiments of the present invention is based on the idea of reducing a vertical distance between the rotation axis of the rollers and the geometric axis of the hinge pins of the modules in the belt.

In particular, one or more aspects of the solution according to specific embodiments of the invention are set forth in the independent claims, with advantageous features of the same solution which are set forth in the dependent claims, the text of which is incorporated herein by reference (any advantageous feature set forth in connection with a specific aspect of the solution according to an embodiment of the invention applying mutatis mutandis to any other aspect).

More specifically, one aspect of the solution according to an embodiment of the present invention proposes a modular roller belt for a conveyor for articles. The belt comprises a plurality of modules for transporting the articles, and a plurality of hinge pins each for hinging adjacent modules of the belt about a corresponding geometric axis. Each module includes at least one roller and at least one mounting pin for idle mounting the at least one roller to the respective module; the at least one roller is freely rotatable about a respective rotation axis defined by the axis of the corresponding mounting pin. In the solution according to one or more embodiments of the present invention, the rotation axis of facing rollers of adjacent modules along an advancement direction of the belt and the geometrical axis of the hinge pin between said facing rollers are spaced apart, along a direction orthogonal to a direction of movement of the respective module, a vertical distance such that a minimum distance between the outer surface of these rollers and the outer surface of the corresponding hinge pin is less than or equal to 3 mm.

In said orthogonal direction, the facing rollers may be at least partially at the same height position as the hinge pin comprised between said rollers. This way, the bodies of the hinge pins and the idle rollers overlap in height direction, and the rotation axis of the idle rollers is relatively close to the geometric axis of the hinge pin. When facing rollers of subsequent modules move away from each other or towards each when the modules rotate about their connecting hinge pin, the change in the gap between facing rollers may be small.

The idle rollers may be mounted with their rotation axis transverse to the flowing direction, and parallel to the geometric axes of the hinge pins. The bodies of the idle rollers may at the bottom of the modules be contained in the modules, i.e. they may not reach through the bottom surface of the modules to support the belt.

The diameter of the idle rollers may be relatively small compared to the diameter of the mounting pins, e.g. the diameter of the mounting pins may be less than ⅓, or ¼ of the diameter of the roller. The rollers may be elongated, with the length of the rollers being twice the diameter of the rollers or more. This may in practice provide a reliably functioning roller that is prevented from seizing up when it is unintentionally exposed to sticky liquid such as lemonade leaking form a packaging to be conveyed.

Orthogonal to the flowing direction, the bodies of the rollers mounted on a module may extend through a plane connecting the tops of the surfaces of subsequent hinge pins, while in flowing direction the bodies of the rollers mounted on the roller me be positioned between subsequent hinge pins. This way, the rollers can be compactly embedded in the module surface.

Advantageously, each module may include a fixing body having a first side portion, a second side portion, and a central portion between the first side portion and the second side portion; in this way, said first side portion and said central portion delimit a first roller-carrying region of the module, and said second side portion and said central portion delimit a second roller-carrying region of the module. In this regard, the at least one roller may comprise at least one first roller in the first roller-carrying region and at least one second roller in the second roller-carrying region, and said first and second roller-carrying regions comprise through-holes suitable for the insertion of respective mounting pins for idle mounting the at least one first roller and the at least one second roller, respectively.

In a preferred but non-limiting embodiment of the invention, each of said first side portion, second side portion and central portion comprises respective front perforated ends and respective rear perforated ends for receiving the hinge pins, so that at least one of said perforated front ends of each module can be hinged to at least one perforated rear end of the next module in the direction of advancement of the belt.

Preferably, though not necessarily, the at least one roller of each module defines a support surface for supporting the articles to be transported, and the modules of the belt define an engagement surface opposite to the support surface; advantageously, said engagement surface may comprise at least one flaring at each module adapted in use to engage movement transmission elements for the movement of the belt.

In an advantageous embodiment of the present invention, said mounting pins and or said hinge pins are in plastic material. In addition or alternatively, said mounting pins have a maximum diameter less than 3 mm.

The belt may comprise at least one aligned succession of modules; in said aligned succession, perforated front ends of the first side portion, the second side portion and the central portion of each module are hinged to the perforated rear ends of the first side portion, the second side portion and the central portion, respectively, of each successive module in the direction of advancement of the belt.

Alternatively, the belt may include at least one staggered succession of modules; in said staggered succession the perforated rear end of the central portion of at least one module is hinged to the perforated front ends of the first portions of a preceding pair of adjacent modules in the advancement direction of the belt. In this case, the belt can also advantageously comprise a plurality of half-modules each arranged substantially laterally offset to said at least one succession of modules to delimit in a uniform manner the support surface of the belt.

The solution according to one or more embodiments of the invention, as well as further features and advantages thereof, will be better understood with reference to the following detailed description, given purely by way of non-limitative example, to be read in conjunction with the accompanying drawings (in which corresponding elements are indicated with the same or similar references and their explanation is not repeated for brevity). In this respect, it is expressly understood that the figures are not necessarily to scale (with some details that may be exaggerated and/or simplified) and that, unless otherwise indicated, they are simply used to illustrate conceptually the structures and procedures described. In particular:

Figure 1A:
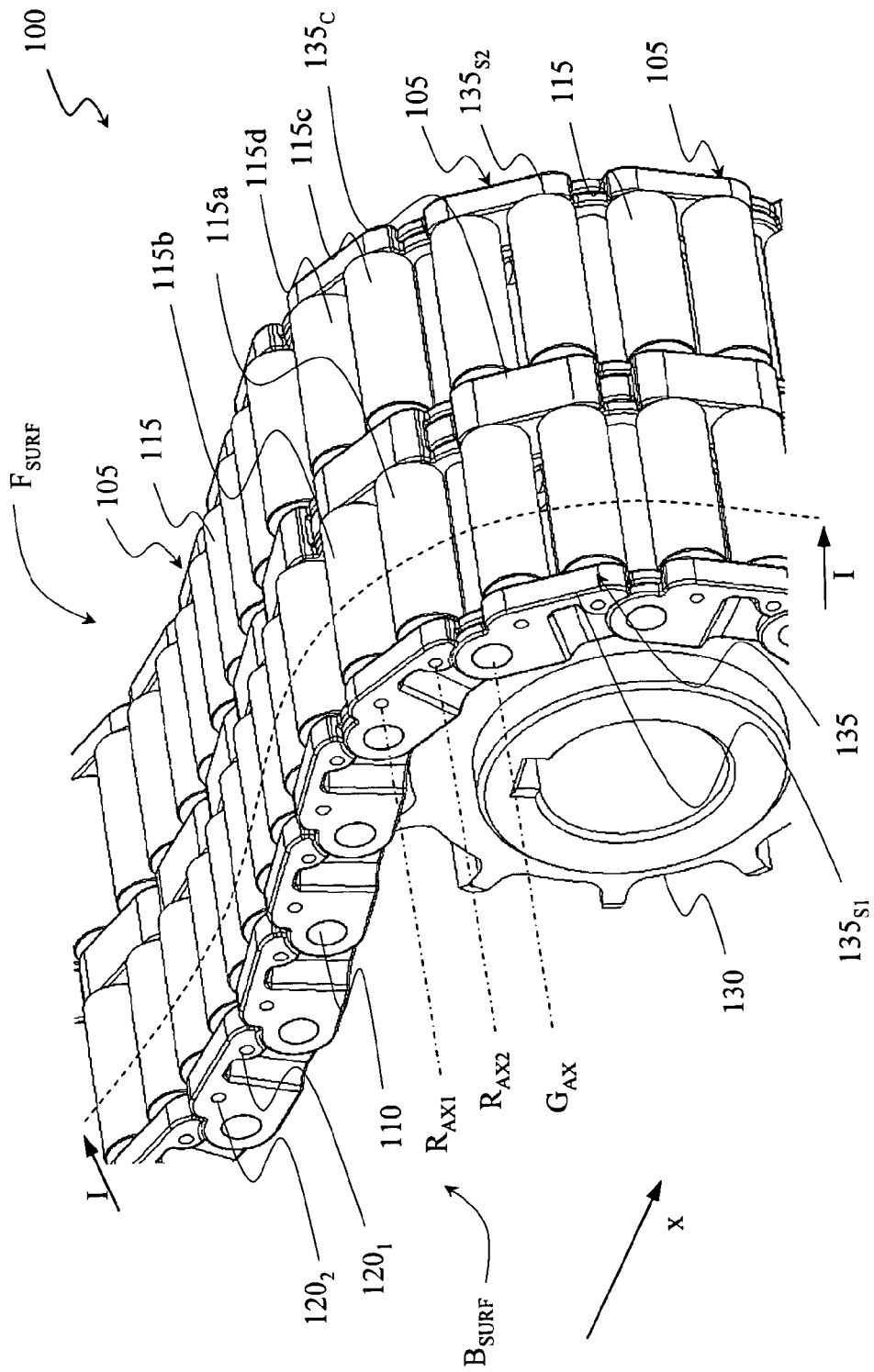
FIG. 1A shows a perspective view of a portion of the belt according to an embodiment of the present invention.

With particular reference to the figures, FIG. 1A shows a perspective view of a portion of belt (hereinafter, belt) 100 according to an embodiment of the present invention. For simplicity of description, this figure will be discussed in conjunction with FIG. 1B, which shows a perspective view of the belt 100 as seen from behind, and FIG. 1C, which shows a sectional view of the same belt 100 along the section line II in FIG. 1A.

The belt 100 is particularly (although not necessarily) suitable to be used in a conveyor of articles (not shown in the figure), for industrial or civil use. In this respect, the conveyor of articles, not limitative for the present invention, will be briefly discussed by invoking, where appropriate, functional elements deemed to be relevant for the understanding of the present invention.

The belt 100 comprises a plurality of modules 105 for transporting the articles, and a plurality of hinge pins 110 for hinging such modules 105 to one another. In particular, each hinge pin 110, preferably of plastic material and/or metallic material, is configured for hinging adjacent modules 105 of the belt about a corresponding hinge axis or geometrical axis (GAX), only one shown in the figure for simplicity, so that the belt appears to be closed in a loop (therefore, endless). In the exemplary but not limitative depicted embodiment, the belt 100 comprises an aligned succession of modules 105, in which each module 105 is hinged to a next module 105 and to a previous module 105 along a direction of advancement x of the belt 100 (with such a structure that can be replicated indefinitely, obtaining a belt of desired length).

As shown in the figures, each module 105 includes one or more sliding rollers (four in the shown embodiment) 115a, 115b, 115c, 115d, or rollers, and mounting pins 1201.1202, for example in plastic material, for idle mounting thereof to the respective module 105. More particularly, as best seen in FIGS. 1A and 1B, the rollers 115a, 115c are mounted idly on the respective mounting pin 1201, so as to be freely rotatable about a respective rotation axis RAX1 defined by the mounting pin, and the rollers 115b, 115d are mounted idly on the respective mounting pin 1202, so as to be freely rotatable about the respective axis of rotation RAX2.

The rollers 115a, 115b, 115c, 115d of all the modules 105 of the belt 100 define, overall, a front surface FSURF of the belt 100 adapted to support the articles to be transported (thus acting as the support surface); in this way, in the case in which, during the transport, a region of accumulation of articles is formed on the belt 100 (as a result, as explained above, of an—even temporary—reduction of the rate of intake of the transported articles downstream of the accumulation region), the rotation of the rollers 115a, 115b, 115c, 115d causes the advancement of the belt 100 along the direction of advancement x to be substantially independent from the advancement of the articles placed thereon, thus avoiding that between the accumulated articles excessive mutual pressures are exerted. Instead, a rear surface BSURF of the belt 100, opposite to the front surface FSURF, acts as an engagement surface, since it includes recesses 125 (visible in FIG. 1B) adapted to intermesh with elements of the transporter responsible for driving the belt 100 (drive elements); such drive elements may include, in a known manner, pinions driven by electric motors (not shown) and idle gear wheels, such as the gear wheel 130.

Figure 1B:
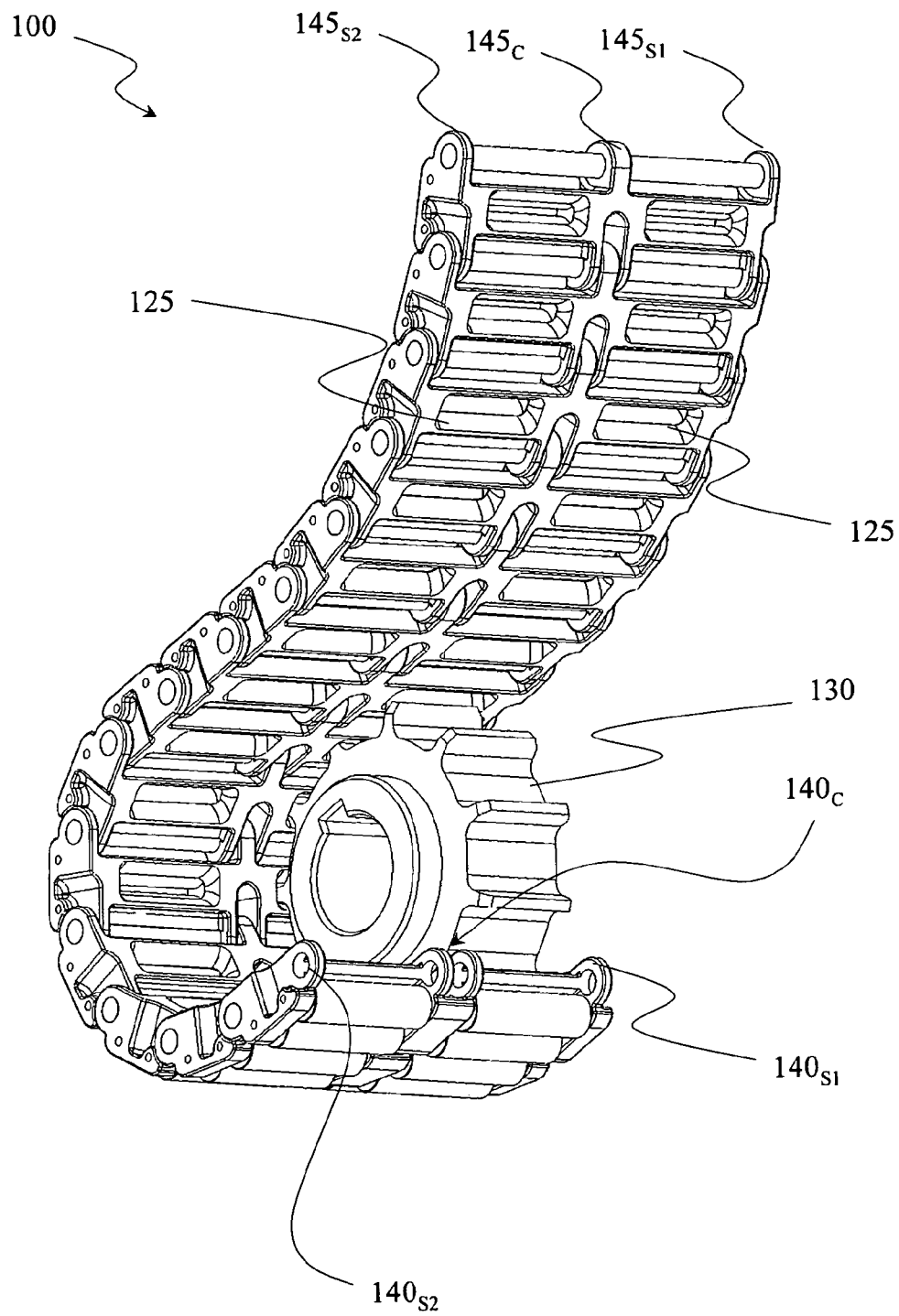
FIG. 1B shows a perspective view of the portion of belt of FIG. 1A seen from behind.

As best seen in FIGS. 1A and 1B, each module 105 comprises a body 135, which acts both as an inter-module hinging element and as a roller-carrying element (hereinafter referred to as mounting body).

More particularly, the mounting body 135 comprises a side portion 135S1, another side portion 135S2, and a central portion 135C between the side portion 135S1 and the side portion 135S2 (compared to which the central portion 135C has a width that is preferably greater, e.g. double). In this way, the central portions 135C of the succession of modules 105 define, overall, a breaker element of the belt 100 (ensuring stability and mechanical strength thereto); also, the side portion 135S1 and the central portion 135C of each module 105 delimit a roller-carrying region containing the rollers 115a, 115b, while the side portion 135S2 and the central portion 135C delimit another roller-carrying region containing the rollers 115c, 115d (although, as will be easily understood, the present invention is not limited to the number of rollers, and each roller-carrying region may include any number of rollers, possibly just one).

The roller-carrying regions, namely the side portions 135S1 and 135S2, and the central portion 135C include through holes (in the considered example, two for each portion) within which there are inserted, respectively, the mounting pin 1201 for mounting the rollers 115a, 115c and the mounting pin 1202 for mounting the rollers 115b, 115d (even if the possibility is not excluded of having independent mounting pins for each roller-carrying region).

As better shown in FIG. 1B, the side portions 135S1 and 135S2, and the central portion 135C of each module comprise respective perforated front ends (or eyelets) 140S1, 140S2, 140C and respective rear eyelets 145S1, 145S2, 145C generally configured to receive the corresponding hinge pins 110 with the adjacent modules. In particular, the front eyelets 140S1, 140S2, 140C have a structure substantially complementary with respect to the rear eyelets 145S1, 145S2, 145C; in this way, the front eyelets 140S1, 140S2, 140C of each module 105 may be hinged to rear eyelets 145S1, 145S2, 145C of one or more subsequent modules 105 in the forward direction x and/or rear eyelets 145S1, 145S2, 145C of one or more modules 105 adjacent along a direction orthogonal to the advancement direction x (not shown), thus conferring modularity to the structure.

More particularly, in the exemplary embodiment shown, in which the belt 100 comprises an aligned succession of modules 105, the front eyelets 140S1, 140S2, 140C of the portions 135S1, 135S2, 135C of each module 105 are hinged to the rear eyelets 145S1, 145S2, 145C of the portions 135S1, 135S2, 135C of each next module in the direction of advancement of the belt 100.

Figure 1C:
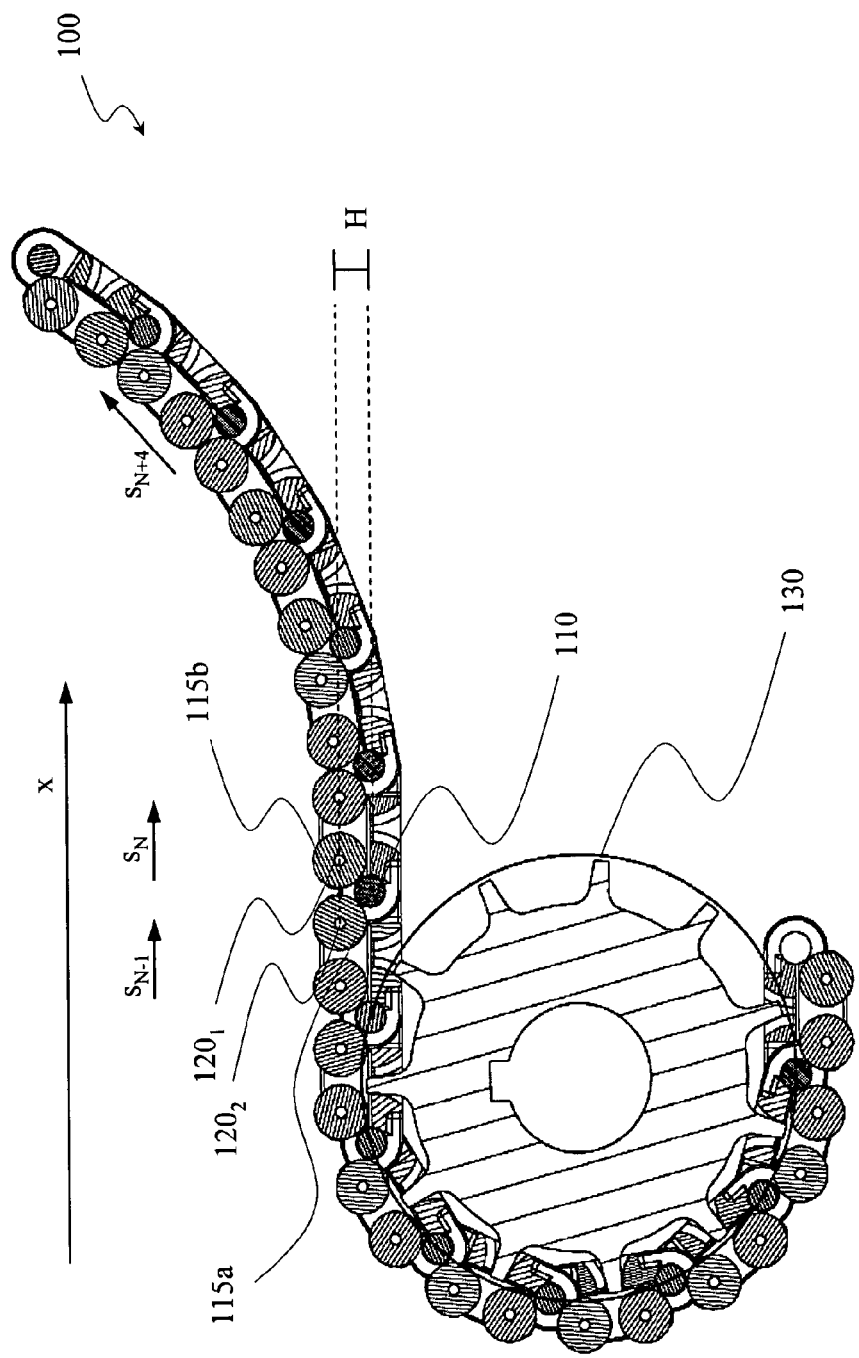
FIG. 1C shows a sectional view of the portion of belt of FIG. 1A along the section line II.

As shown in FIG. 1C, in the solution in accordance with an embodiment of the invention, the rotation axis of facing rollers of adjacent modules (i.e., the rotation axis RAX1 of the rollers 115a, 115c of the module 105 and the rotation axis RAX2 of the rollers 115b, 115d of next module 105 in the sequence) are spaced apart from the geometric GAX of the corresponding hinge pin 110 included therebetween, a vertical distance H, along a direction orthogonal to an advancement direction sN, sN−1 of the respective module 105, which is advantageously reduced compared to known solutions (in the shown example, the direction of advancement sN, sN−1 of the respective modules 105 coincides; however, the above considerations apply also equivalently if this is not the case, as in the case of the shown advancement direction sN+4).

In particular, such vertical distance H is such that between the outer surface of each roller 115b, 115d and 115a, 115c and the respective hinge pin 110 there is a minimum distance ranging from a tenth of mm (as shown in the figure) and 3 mm (in any case, much more reduced compared to known solutions, for which the minimum distance has values greater than or equal to 12 mm).

In any case, nothing prevents that this minimum distance is substantially equal to zero, for example in the case in which between the rollers 115a, 115b, 115c, 115d and the hinge pins 110 there is a friction coefficient sufficiently low to enable as well an appropriate rotation of the rollers; this can be achieved, for example, by providing mounting pins 1201, 1202 of reduced diameter (e.g., less than 3 mm) compared to the known solutions (in which the mounting pins typically have a diameter greater than 6 mm, and then a corresponding double friction coefficient). In this respect, the reduction of the diameter of the rollers 115a, 115b, 115c, 115d (which in principle leads to a lower resistance to stresses thereof) is compensated by the improved mechanical strength (e.g., by means of the belt-breaker elements of the belt 100, and/or by means of advantageous configurations, such as that described below) that the present invention allows to obtain.

It should be noted that the reduction of the minimum distance is also made possible by the particular structure of the modules described above; in fact, the presence of a reduced, but well distributed, number of front eyelets 140S1, 140S2, 140C and rear eyelets 145S1 145S2, 145C within which the hinge pins 110 are inserted, causes the latter to be for the most part thereof uncovered (rather than fully covered, as in known solutions, in which instead the value of minimum distance is for that very reason intrinsically higher than that of the present invention).

The described solution is advantageous since it allows to reduce the depth of the gaps between adjacent rollers without having to reduce the diameter of the rollers, which would increase the friction coefficient, and without altering the pitch between the rollers, which gives to the belt the ability to bend and counter-bend freely about the geometrical axis. The present invention can therefore be used for an optimal transport of classes of articles which usually are more subject to phenomena of jam in the interstices, such as the articles which have at their base, or in correspondence with regions that lay on the rollers during transport, a shaped conformation (as in the case of the supporting feet of plastic bottles).

Figure 2:
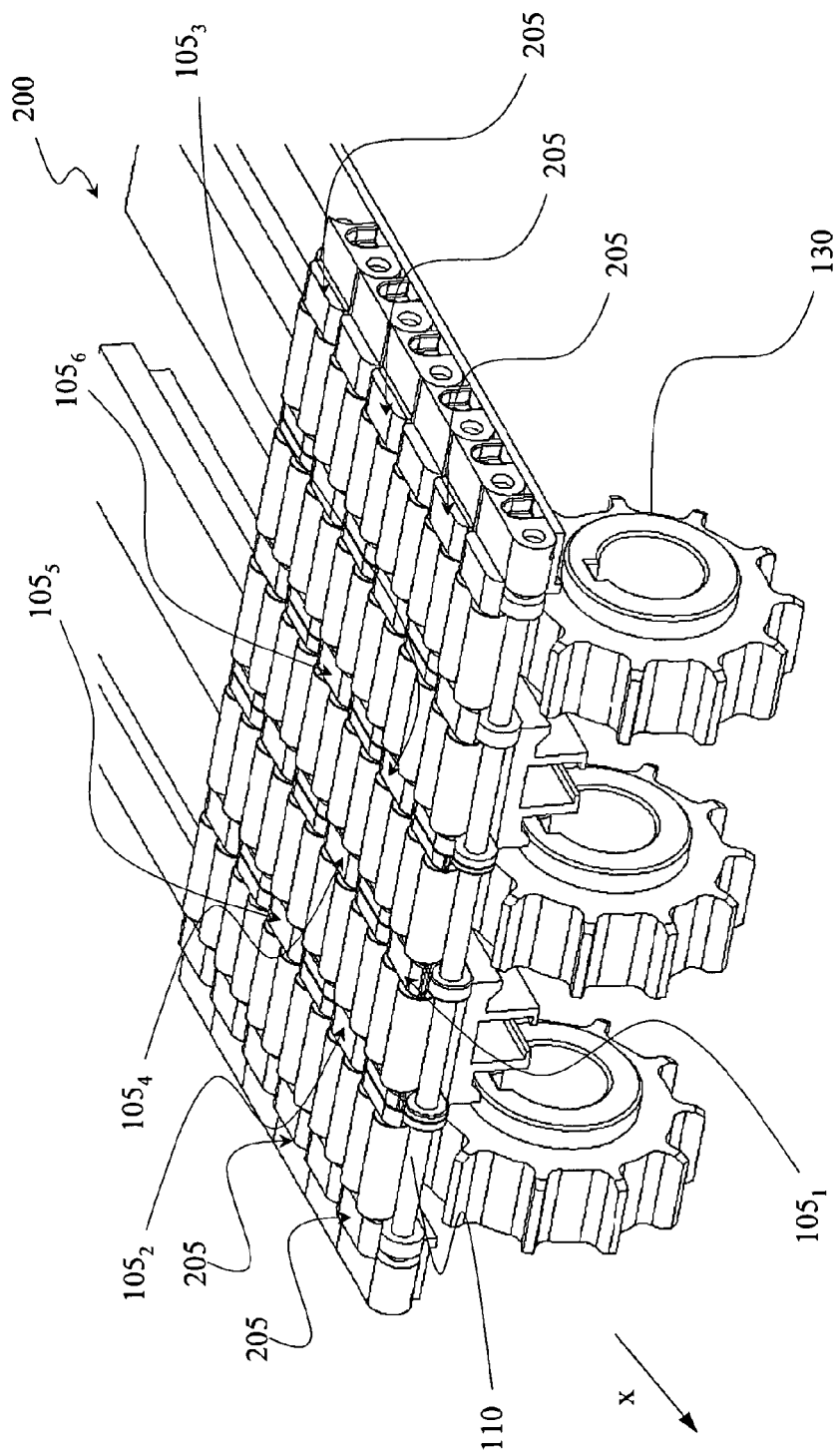
FIG. 2 shows a perspective view of a portion of the belt according to another embodiment of the present invention.

Making now reference to FIG. 2, it shows a perspective view of a portion of belt (or simply belt) 200 according to another embodiment of the present invention. The belt 200 is substantially equivalent to the former belt, but differs therefrom for the way in which the modules are hinged together.

In particular, as visible in this figure, the belt 200 comprises a staggered succession of modules, that is, one in which there are provided modules (like modules 1051 and 1054) that are common (i.e. hinged with) two separate modules (like modules 1052, 1053 and 1055, 1056, respectively) immediately preceding them (in the forward direction x of the belt 200) and arranged them side by side (i.e., along a direction orthogonal to the advancement direction x). In other words, the eyelets rear 145C of the central portion of each common module are hinged to the front eyelets 140S2, 140S1 of the side portions 135S2, 135S1 of a previous pair of adjacent modules (reference numerals of the eyelets are not shown in the figure for simplicity). In this way, as visible in the figure, the portions 135S1, 135S2 of such pairs of modules 1052, 1053 and 1055, 1056 define, together, a portion of the same size as, and aligned with, the central portion of the respective common modules 1051 and 1054, thereby obtaining the breaker element described above.

In order to make the structure of the belt 200 thus obtained regular, the latter also comprises a plurality of half-modules 205; in particular, each half-module 205, equal to half the module, is arranged substantially laterally offset to said succession of modules to delimit in a uniform manner the support surface of the belt.

This embodiment is particularly advantageous since the staggered succession of modules gives the structure improved properties of resistance to mechanical stresses generated by the articles to be transported.

In the embodiment shown, in the direction sN orthogonal to the flowing direction N, the facing rollers 115a, 115b are partially at the same height position as the hinge pin 110 comprised between the facing rollers 115a, 115b. The bodies of the hinge pin 110 and the idle rollers 115a, 115b are next to each other and overlap in height direction. The rotation axis of the idle rollers RAX1, RAX2 is in height direction relatively close to the geometric axis GAX of the hinge pin 110. When facing rollers 115a, 115b of subsequent modules move away from each other or towards each when the modules rotate about their connecting hinge pin, the change in the gap between facing rollers may be small. The idle rollers 115a, 115b are mounted with their rotation axis RAX1 RAX2 transverse to the flowing direction N, and parallel to the geometric axes GAX of the hinge pins 110.

The diameter of the idle rollers 115 may be relatively small compared to the diameter of the mounting pins 120. As shown, the diameter of the mounting pins 120 is less than ¼ of the diameter of a roller 115. The rollers 115 are elongated. The length of the rollers 115 along the rotational axis RAX is more than twice the diameter of the rollers 115.

Orthogonal to the flowing direction N, the bodies of the rollers 115 mounted on a module 105 extend through a plane connecting top surfaces of subsequent hinge pins 110. In flowing direction N the bodies of the rollers 115 mounted on the module 105 are positioned between subsequent hinge pins 110. The rollers are compactly embedded in the surface of the module 105.

Naturally, in order to satisfy contingent and specific requirements, one skilled in the art may introduce to the solution described above many modifications and logical and/or physical variations. More specifically, although such a solution has been described with a certain level of detail with reference to one or more embodiments thereof, it is clear that various omissions, substitutions and changes in shapes and details, as well as other embodiments are possible. In particular, various embodiments of the invention may be practiced without the specific details (such as the numerical examples) exposed in the foregoing description to provide a more complete understanding thereof; on the contrary, well-known features may be omitted or simplified in order not to obscure the description with unnecessary details. Furthermore, it is expressly understood that the specific elements described in connection with each embodiment of the presented solution may be incorporated in any other embodiment as a normal design choice.

Similar considerations apply if the belt has a different structure or includes equivalent components. In any case, any of its components can be separated into several elements, or two or more components can be combined into a single element; in addition, each component can be replicated to support the execution of the corresponding operations in parallel. It should also be noted that (unless stated otherwise) any interaction between different components generally need not be continuous, and can be direct or indirect via one or more intermediaries. For example, thanks to the intrinsic modularity of the modules, the belts (i.e., portions of the belt) previously illustrated can be suitably replicated and/or in combined, or they can be implemented in accordance with additional configurations according to specific requirements.

The invention claimed is:

1. A modular roller belt for a conveyor of articles, said belt comprising:
    a plurality of modules including a first module for conveying the articles, said first module including an upper surface and at least one roller rotatably mounted above said upper surface for rotation about a rotation axis and defining a support surface for supporting an article being conveyed, said rotation axis being spaced above said upper surface of said first module when said support surface supports an article being conveyed; and
    a plurality of hinge pins, each hinge pin of said plurality of hinge pins having a hinge pin outer circumference and hinging said first module to an adjacent module of the plurality of modules around a corresponding geometric axis, when said support surface supports an article being conveyed, said at least one roller of said first module having a roller outer circumference, in a vertical direction orthogonal to a flowing direction, a lower portion of said roller outer circumference extends downwardly toward said upper surface and overlaps an upper portion of said hinge pin outer circumference.

2. The modular roller belt according to claim 1, wherein in said orthogonal direction, said at least one roller and an-adjacent rollers of said adjacent module is at least partially at the same height position as the hinge pin hinging said adjacent modules.

3. The modular belt according to claim 1, wherein the at least one roller mounted on the first module is between hinge pins hinging said first module to adjacent modules.

4. The modular roller belt according to claim 1, wherein said first module includes a fixing body having a first side portion, a second side portion, and a central portion between the first side portion and the second side portion, said first side portion and said central portion delimiting a first roller-holder region of the module and said second side portion and said central portion delimiting a second roller-holder region of the module, and wherein the at least one roller includes at least one first roller within the first roller-holder region and at least one second roller within the second roller-holder region, said first and second roller-holder regions including through holes adapted to the insertion of respective mounting pins for idler mounting of the at least one first roller and of the at least one second roller, respectively.

5. The modular roller belt according to claim 4, wherein each one of said first side portion, second side portion and central portion includes respective front holed ends and respective rear holed ends for receiving the hinge pins, at least one of said front holed ends of each module being hinged to at least one rear holed end of the following module in the flowing direction of the belt.

6. The modular roller belt according to claim 1, wherein the at least one roller of said first module defines a support surface (FSURF) for supporting the articles to be conveyed, and wherein the first module defines an engagement surface (BSURF) opposite the support surface, said engagement surface including at least one flare adapted in use to engage motion transmission elements for the movement of the belt.

7. The modular roller belt according to claim 1, wherein at least one of a mounting pin rotatably mounting said at least one roller and said hinge pins are of plastic material.

8. The modular roller belt according to claim 1, wherein said rotation axis is defined by a mounting pin having a maximum diameter less than 3 mm.

9. The modular roller belt according to claim 4, wherein the belt comprises at least one aligned sequence of first modules, in said aligned sequence the front holed ends of the first side portion, the second side portion and the central portion of each first module being hinged to the rear hole ends of the first side portion, the second side portion and the central portion, respectively, of the corresponding following adjacent module in the flowing direction of the belt.

10. The modular roller belt according to claim 4, wherein the belt comprises at least one staggered sequence of first modules, in said staggered sequence the rear holed end of the central portion of at least one module being hinged to the front holed ends of the first portions of a pair of previous adjacent modules in the forward direction of the belt.

11. The modular roller belt according to claim 10, further comprising a plurality of half-modules each one being arranged substantially laterally to said at least one staggered sequence of first modules for uniformly delimiting the support surface of the belt.

12. The modular roller belt according to claim 1, wherein said rotation axis is defined by a mounting pin and a diameter of the mounting pin is less than $\frac{1}{3}$ of the diameter of the roller.

13. The modular roller belt according to claim 1, wherein a length of the at least one roller is at least twice a diameter of the at least one roller.

14. A modular roller belt module comprising:
a body having an upper surface;
a hinge pin intermeshed with said body for hingedly connecting said body to an adjacent body about a hinge axis, said hinge pin having a hinge pin outer circumference;
a roller rotatably mounted above said upper surface for rotation about a rotation axis spaced above said upper surface of said first module, said roller having a roller outer circumference, wherein in a vertical direction orthogonal to a flowing direction of said body, a lower portion of said roller outer circumference overlaps an upper portion of said hinge pin outer circumference.

15. The modular belt according to claim 1, in which the rotation axis of said at least one roller of said first module and an adjacent roller of an adjacent modules hinged to said first module along a forward direction of the belt and the geometric axis of the hinge pin hinging said first module to said adjacent module are spaced apart, along a direction orthogonal to a flowing direction of the first module, by a vertical distance such that a minimum distance between the outer surface of such rollers and the outer surface of the corresponding hinge pin is 3 mm or less.

* * * * *